US005864805A

United States Patent [19]
Chen et al.

[11] Patent Number: 5,864,805

[45] Date of Patent: Jan. 26, 1999

[54] METHOD AND APPARATUS FOR ERROR CORRECTION IN A CONTINUOUS DICTATION SYSTEM

[75] Inventors: Chengjun Julian Chen, White Planis; Liam David Comerford, Carmel; Catalina Maria Danis, Mount Vernon; Satya Dharanipragada, Ossining; Michael Daniel Monkowski, New Windsor; Peder Andreas Olsen, Ossining; Michael Alan Picheny, White Plains, all of N.Y.

[73] Assignee: International Business Machines Corporation, Armonk, N.Y.

[21] Appl. No.: 770,390

[22] Filed: Dec. 20, 1996

[51] Int. Cl.[6] ........ G10L 7/08

[52] U.S. Cl. ........ 704/235; 700/270

[58] Field of Search ........ 704/235, 275, 704/254, 243, 244

[56] References Cited

U.S. PATENT DOCUMENTS

| | | | |
|---|---|---|---|
| 4,866,778 | 9/1989 | Baker | 704/254 |
| 5,027,406 | 6/1991 | Roberts et al. | 704/244 |
| 5,367,453 | 11/1994 | Capps et al. | 707/531 |
| 5,384,892 | 1/1995 | Strong | 704/243 |
| 5,386,494 | 1/1995 | White | 704/275 |
| 5,682,439 | 10/1997 | Beernick et al. | 382/187 |

*Primary Examiner*—Richemond Dorvil
*Attorney, Agent, or Firm*—Whitham, Curtis & Whitham; Robert P. Tassinari, Esq.

[57] ABSTRACT

A continuous speech recognition system has the ability to correct errors in strings of words. The error correction method stores data in the system's internal state to update probability tables used in developing alternative lists for substitution in misrecognized text.

24 Claims, 9 Drawing Sheets

Error Correction

Decoder Engine

METHOD AND APPARATUS FOR ERROR CORRECTION IN A CONTINUOUS DICTATION SYSTEM

BACKGROUND OF THE INVENTION

1. Field of the Invention

The present invention generally relates to continuous speech recognition systems and, more particularly, to methodologies for presenting the user with control over correction activity.

2. Background Description

In a continuous speech recognition system designed to decode speech without pauses between words, it is reasonable to expect that errors of decoding will take place and will have to be corrected by the user. The effort needed to correct errors may be affected by both the visual presentation of information supporting correction and by the actions the interface allows the user to perform on the presentation.

Speech recognition systems of the kind typified by the recognition engines developed at the International Business Machines (IBM) Thomas J. Watson Research Center are able to decode continuous utterances comprising many connected words. Unfortunately, even human listeners occasionally mistake one sequence of words for another. It is therefore a feature of such recognition engines that alternative strings of words for any given acoustic sequence are stored against the possibility that the choice presented by the recognizer is incorrect. Storing the alternative strings allows the user to be presented with alternative choices. Alternatively, the acoustic data can be stored in a certain form, and the portion corresponding to the incorrect words could be decoded again and a number of alternatives displayed for the user to choose from.

The presentation of choices from recognized alternatives is common practice in the human interfaces of discrete word recognition systems. In such systems the incorrect word can be indicated by the user, and the system user interface can, in response, present a list of alternative words. Such systems typically order the word list according to the probability associated with each word according the acoustic evidence and the language model scores.

In continuous speech recognition systems, word boundaries are not well fixed by the system since the user does not indicate word boundaries by pausing. For example, the sentences "Do you know how to recognize speech?" and "Do you know how to wreck a nice beach?" have fundamentally indistinguishable acoustics but very different content. A user faced with correcting this form of error is not given the means to address a sequence of words by the conventional discrete correction methods. Thus, the technique used in discrete error correction does not apply effectively to this problem.

SUMMARY OF THE INVENTION

It is therefore an object of the present invention to provide a technique which minimizes the effort required of the user to perform these necessary correction actions.

In the practice of the invention, the user interacts with the program to identify misrecognitions following dictation. This causes the decoder engine to access alternative decodings of the interval of continuous speech indicated by the user's selections, in order to generate a list of alternatives to the misrecognition. The alternatives appear as individual words or word sequences, depending on the length of the interval. The user then selects an alternative or a portion of an alternative from the list to replace the identified misrecognition. If only a portion of an alternative is chosen, the program recognizes what section of the misrecognition it should replace and generates a new list of alternatives to replace the part of the misrecognition which was not replaced.

The user could also select only a space as a misrecognition. In this situation, the program would provide a list of alternatives which could fit in that space based on the context of the sentence. This list of alternatives may be derived solely from the language model or by re-decoding the interval of acoustic data including that presumed interword space and its surrounding decoded words.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
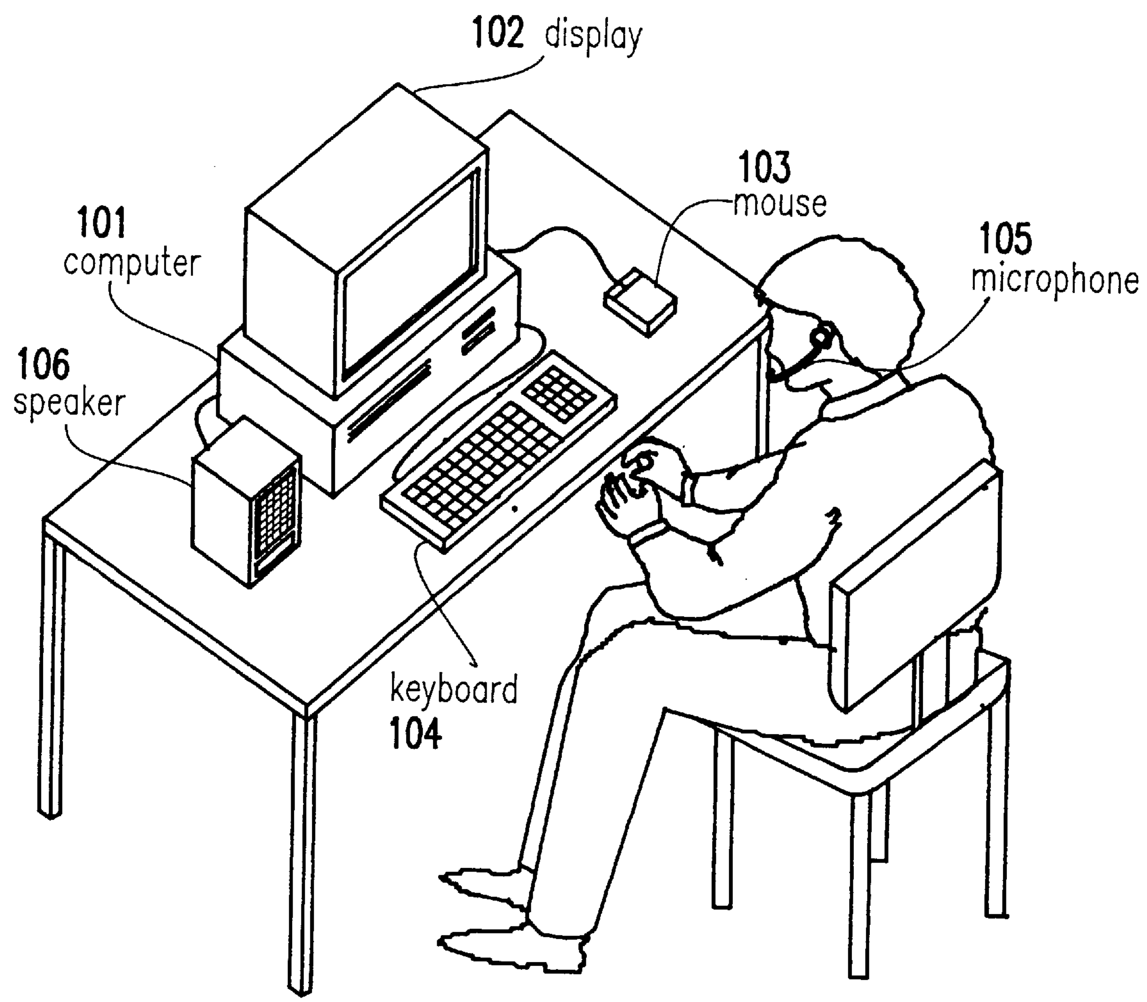
FIG. 1 is a pictorial representation of a speech recognition system (machine dictation) on which the invention is implemented.

Referring now to the drawings, and more particularly to FIG. 1, there is shown a drawing of the elements used in a speech recognition system on which the present invention may be implemented. The system includes a computer 101, such as a personal computer or workstation, having a display monitor 102, a mouse 103 or other pointing device, and a keyboard 104. A microphone 105 is used to dictate to the computer 101, and a speaker 106 is used for providing acoustic feedback to the user. The computer is specifically equipped with the interface required to acquire acoustic information from the microphone. Such equipment maybe present on the computer mother board or on a daughter card such as SOUNDBLASTER (TM Creative Labs), or through other means.

Figure 2:
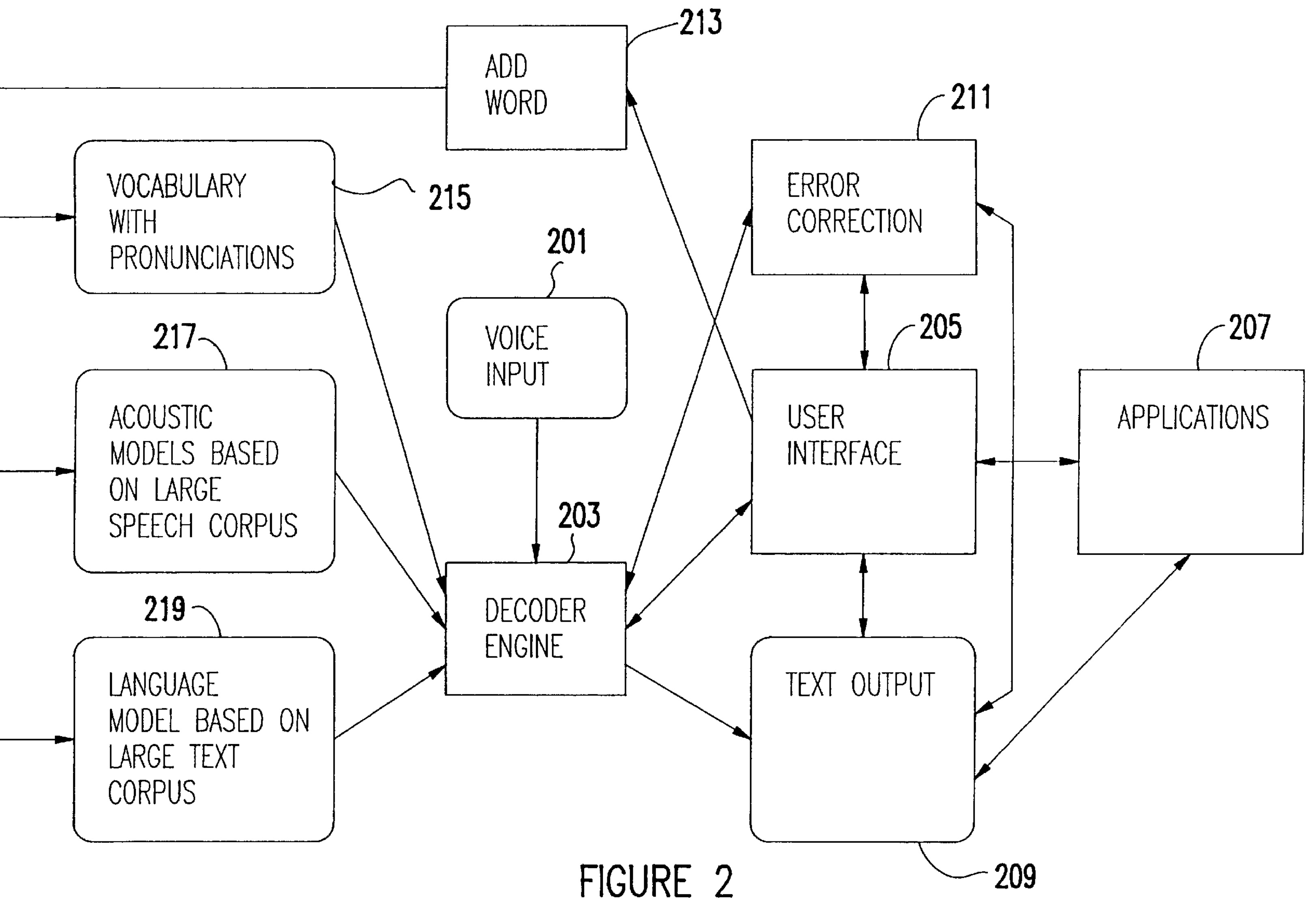
FIG. 2 is the block diagram of the machine dictation system, showing the role of error correction mechanism.

The mode of operation is shown in the system block diagram of FIG. 2. Voice input 201 comes from the user. The decoder engine 203 is of the type typified by the IBM voice type dictation engines, which operates constantly, taking voice input 201 and eventually creating text output 209. To do this, the decoder engine 203 calls on data from the system vocabulary 215, acoustic models 217 and language based models 219 and performs conventional operations involving matching the acoustic input to acoustic models, generating many hypothetical matches for any acoustic segment, and using the language model to winnow these selections down to a smaller set of hypothetical best matches, and selecting one among the members of the short list as a best match based on a selection criteria.

It is a property of the IBM decoder that, as decoding progresses, the decoder builds a lattice of possible decodings based on acoustic and language model information to compute the most likely uttered sequence of words. This lattice is a hierarchical structure that contains at each node the following information:

1. The word.
2. The start and end time of the word.
3. Two scores obtained from acoustic and language model information, respectively.

This structure enables it to compute the best paths (most probable sequences of words) up to a given time using an algorithm known as Dijkstra's algorithm.

The system vocabulary may be set by the programmer based on subjects on which a particular user may be focused, for example, legal, medical, scientific, etc., or by the user applying a program option. In one embodiment, the user also has the option of adding 213 to a program's vocabulary either permanently or for a particular application. The option is useful to add surnames and new "catch" words, acronyms or the like in a particular field.

The vocabulary 215 and acoustic model's 217 data is used by the decoder engine 203 to derive a list of candidate words and phrases which may represent the sounds given by a user. The acoustic model is derived from a large corpus of speech amounting in current (1996) systems, to hundreds of speakers providing hundreds of spoken sentences each. Such an acoustic model has proven robust in the face of gender and accent differences.

Having derived a list of candidate words and word sequences or phrases for any given acoustic segment, the decoder engine then uses the data in the language model to further refine and order the list of candidates.

The language model 219 provides data about the common word sequences so the engine may determine what candidate phrases are likely. This is important for choosing between words and phrases which contain phonetically similar words, for example, "to", "two" and "too", or "there", "their", and "they're", or "putting" and "put in". Once all the factors have been considered by the decoder engine 203, text is made available by the engine as text data at 209. Making the text available can include notification from the engine, to other components, that new text has arrived.

It should be understood that specific implementations of speech recognition systems may include processing components, data sets, and data paths not shown here. In general, however, recognizers will necessarily include the components and data sets shown, and, a decoder, such as this, which provides candidate phrases, is required for the execution of this invention.

Having decoded some user voice input, either the decoder engine 203 or some one of the applications 207 may display that text to the user through the user interface 205 presentation.

At this point, the user may detect an error and activate the error correction component 211. This may be done by any of the conventional graphical user interface (GUI) methods including but not limited to using the mouse to highlight the incorrectly decoded text and selecting "correct" (for example) from pull down menu. During error correction, the user interacts with the system choosing the incorrectly decoded word or sequence of words in the decoder output text. Such interactions may include adding to the vocabulary of the recognizer by storing new word spellings and pronunciations in the vocabulary 215. The engine, at the request of the error corrections component, provides text output which represents the candidate words and phrases which the engine previously considered candidates for decoding that segment of the user's speech and (or alternatively) uses vocabulary, acoustic and language models to develop alternatives which may replace the wrong word or phrase. At any point in this process, at the discretion of the user interface designer, a prompt may be offered to the user in order to provide their connection activities. The prompts may take any conventions from including but not limited to text messages, audio output from the computer speakers, video, or animation of screen elements.

Figure 3:
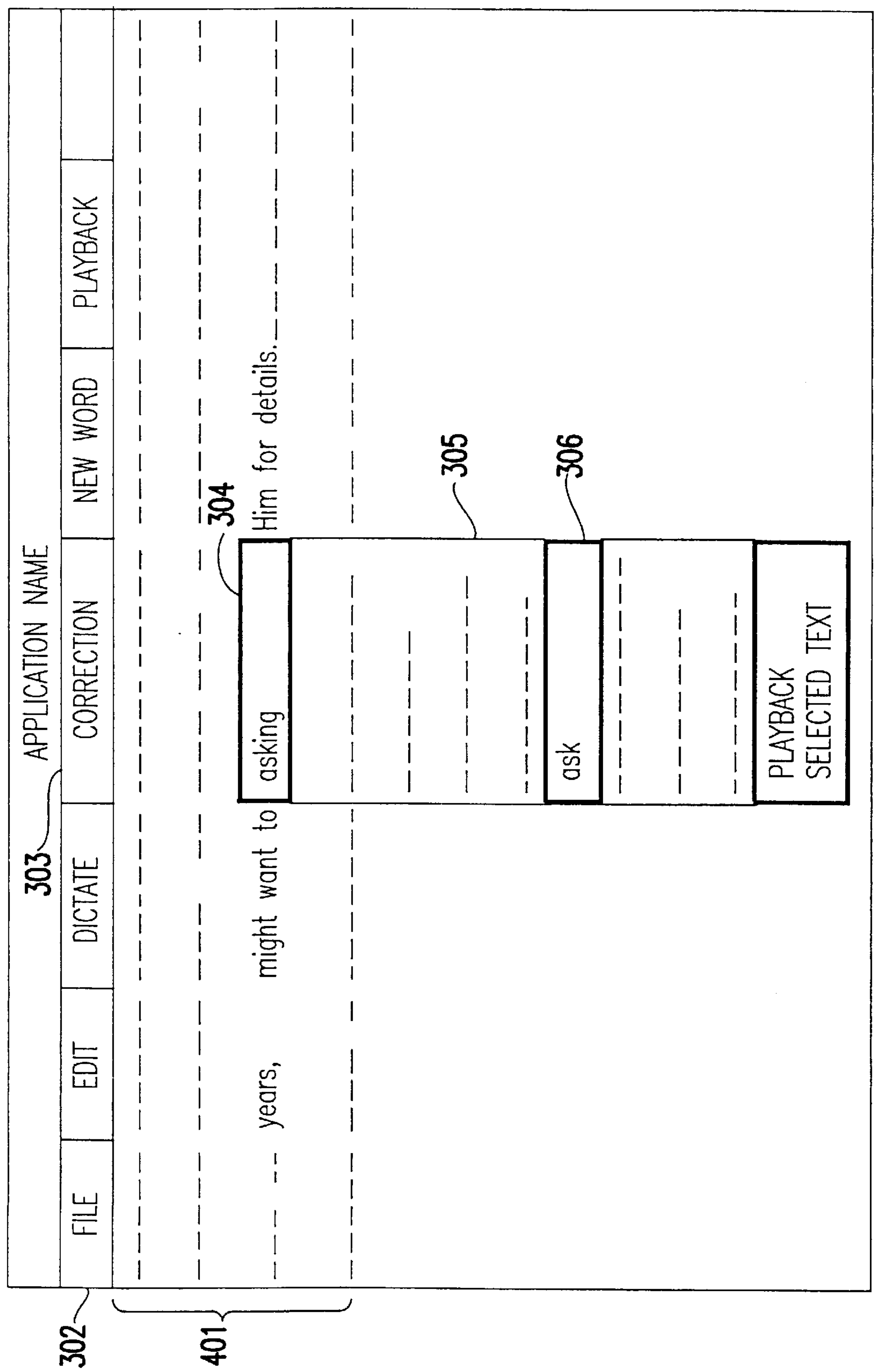
FIG. 3 is a representation of a computer screen showing a pull down menu of single words used in the error correction mechanism in a discrete word dictation system.

FIG. 3 is an example of a window on a display monitor screen for an application using a discrete word dictation system. As can be seen, text 301 as recognized is displayed. Pull down menu items 302 are shown at the top of the screen. In practice, the user can select the "correction" item 303 on the menu bar after selecting the word 304 which needs correcting. On choosing correction, a list of alternative words 305 will appear in a dialog or a tear off menu below the incorrect word 304. Optionally, the user may have his dictation replayed. This allows the user an aid in recalling exactly what was said. Finally, the user would select a replacement word 306 from the list of alternative words 305. This replacement word 306 would then be inserted in the text in place of the incorrect word 304. If the correct word does not appear on the list, the user may type in a replacement. Frequently, this act is used to trigger the add word 213 component.

Figure 4:
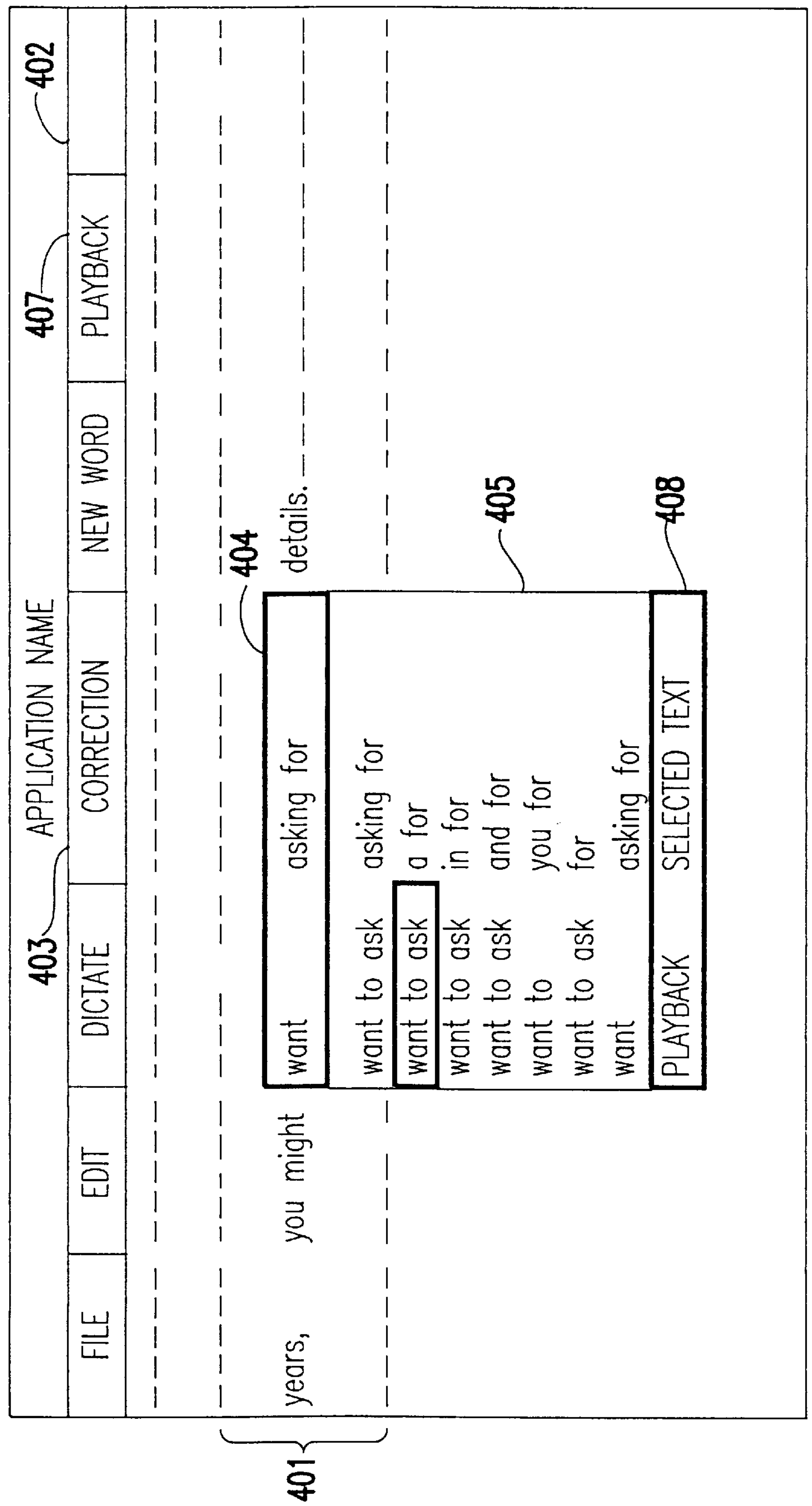
FIG. 4 is a representation of a computer screen showing a pull down menu of word sequences used in the error correction mechanism in a continuous dictation system.

FIG. 4 is an example of a window on a display monitor screen in the inventive continuous speech recognition system. The text 401 as recognized is shown beneath a menu bar 402. A string 404 of consecutive incorrect words is selected by the user and the "correction" item 403 on the menu bar 402 is chosen. Once this is done, the start and end time of the phrase are used to extract a sublattice from the tree for the complete sentence. The decoder then computes an ordered list of alternative choices based on the language and acoustic scores. This list 405 of alternative phrases may then be displayed. An alternative order may be derived by taking into account the fact that the start and end times of the highlighted phrase is frequently well aligned with the start and end times of the uttered phrase the decoder is attempting to locate. It may therefore be beneficial to rearrange the previous list according to the match of the start and end times since the surrounding words have, in effect, been acknowledged as correct by the user.

The user does not have to select an entire phrase from the list 405. A portion 406 of a phrase can be chosen. Once the desired portion 406 of the phrase is selected, the system substitutes that portion into the string 404 to replace those consecutive incorrect words, which represent the same acoustic segment as the portion 406 of selected correct words. The correction system then re-processes, as above, the acoustic segment represented by the words which were left unchanged by the replacement. The system will then display a new alternative word sequence list for the remaining portion of the error to be corrected.

The selection can be made such that a terminal point of the selection is within a word of the presented decoded text.

The terminal points of the mark indicate to the recognition system that these points correspond to word boundaries. The program uses the selected portion and the best candidate from the re-decoded speech to replace the string of consecutive incorrect words, including the partially selected word.

As an aid to correction, the user can choose the menu item "playback" 407. When this choice is made the acoustic data corresponding to the selected text is played back on audio so that the user may review what was said before deciding to make a correction. If during correction the user wishes to playback, a "playback selected text" item 408 is conveniently available at the end of the list of alternative phrases 405.

Figure 5:
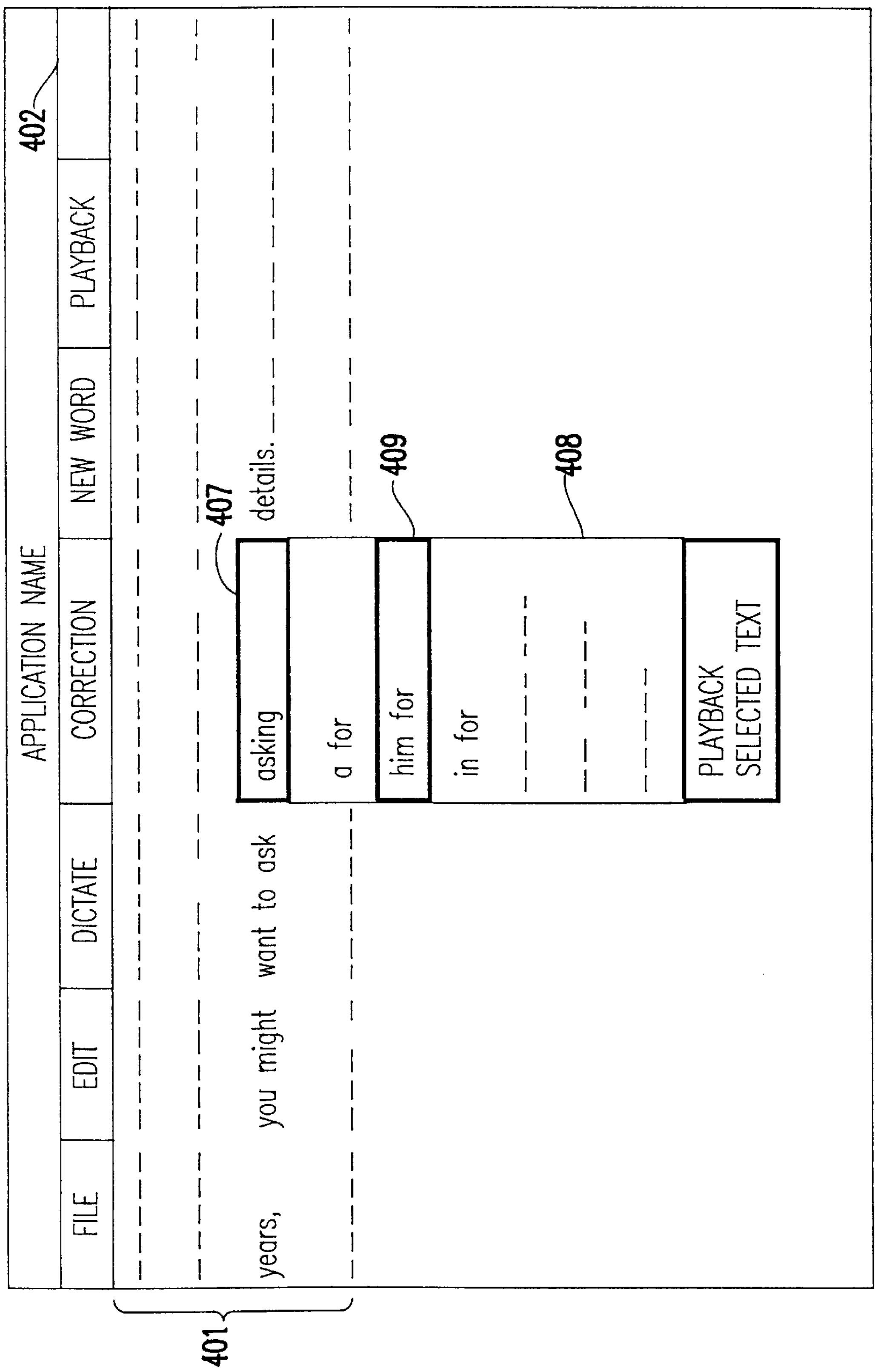
FIG. 5 is a representation of a computer screen showing a pull down menu displayed in the second step and subsequent steps in the error correction mechanism for a continuous dictation system.

In FIG. 5, the remaining uncorrected words 407 remain highlighted. Any word in the remaining portion of the error selection which has been fragmented by the preceding partial correction, may be represented by an appropriately long string of place holder symbols such as question marks. The playback feature will further aid the user in understanding these place holders. Using acoustic and language based models, the system displays a new set 408 of alternative words and word sequences. The user can then select a desired alternative 409 and complete correction of the string 404 previously designated as incorrect. In any case, provision (such as over typing the selection on a separate type-in field) is made for typing, redictating or spelling the correction words by phonetic alphabet, such as the well-known "military" alphabet.

In the process described with reference to FIGS. 4 and 5, only the words within the boundaries highlighted by the user are used to develop the alternatives found using language and acoustic models. In a more sophisticated embodiment, the words immediately adjacent to the boundaries chosen by the user may be included. This is because in continuous speech recognition systems, sometimes smaller words are not picked up and are merged into larger words. For example, where the program has recognized the sentence "I understand that Paul has done this in previous years, you might want asking for detail", the word "asking" may be chosen as the only incorrect word. However, if the word "want" is not included in the search of the language and acoustic models, the search result may not include the correct alternative of "to ask him" as a replacement for "asking", since the word "to" has been incorrectly merged into the word "want".

In addition, the selected incorrect word or phrase itself will cause the system not to give a correct choice in the list of alternatives; i.e., for the sentence "can you recognize peach today?", "peach" being incorrect, "speech" may not be provided as an alternative unless "recognize" and "today" are included in the searching process so that language models and the acoustic content at the end of "recognize" and the start of "today" may be used. Following this methodology to its logical conclusion several words on either or both sides of the selected incorrectly decoded text may be used in the alternative generation process.

Figure 6:
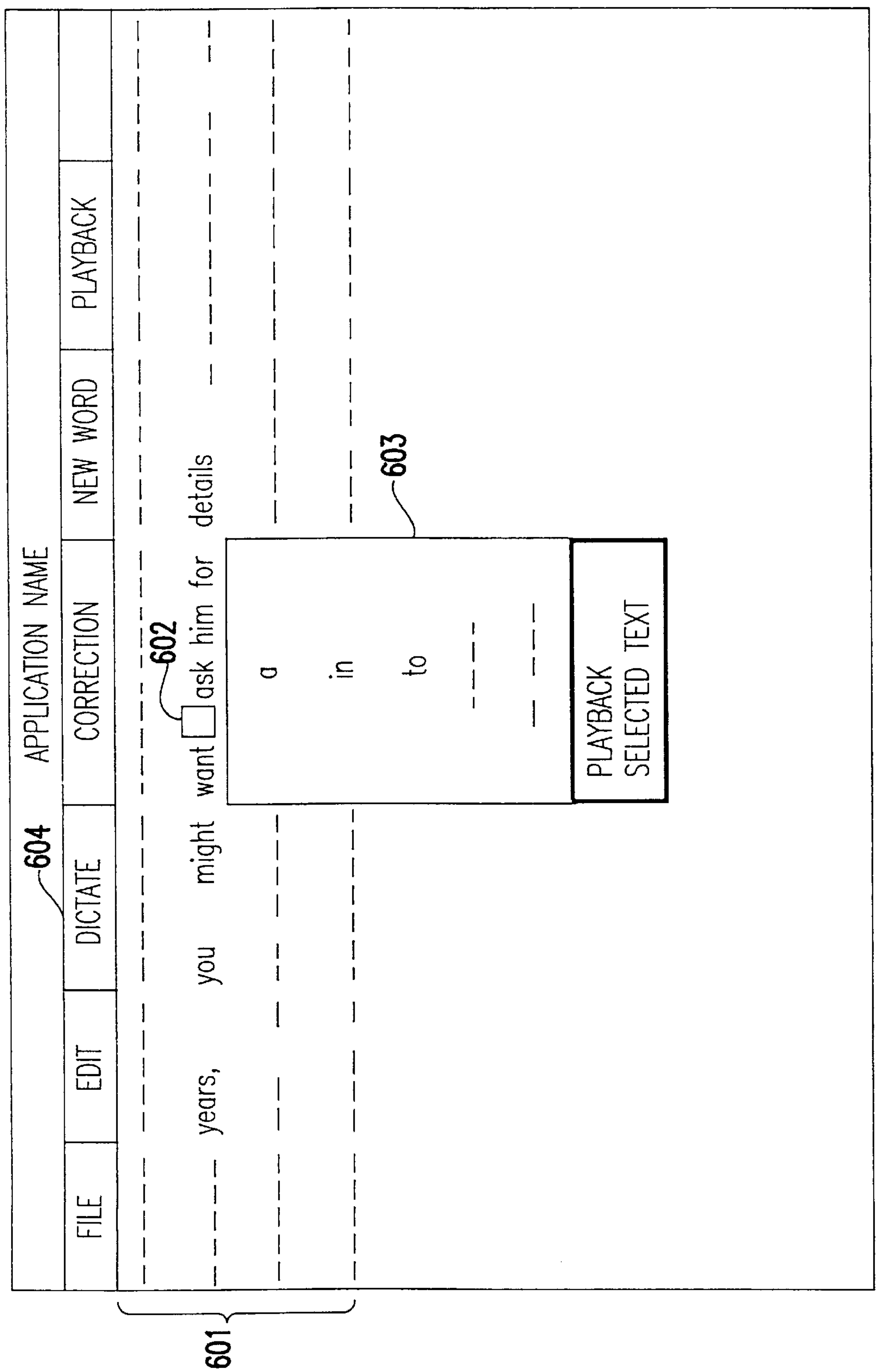
FIG. 6 is a representation of a computer screen showing a pull down menu displayed during the course of the error correction process for a single word.

In FIG. 6 the embodiment of another feature of this error correction system is illustrated. There is shown a window on a display monitor screen having text 601 and highlighted space 602 within the text 601. This highlighted space 602 represents a missing word. A list of alternatives 603 appears beneath the highlighted space 602. The list of alternatives is developed using the language and acoustic models which consider up to several words on either side of the space as described above. Instead of requesting a list of alternatives from the computer, the user may also choose the dictation button 604 and dictate the words needed to fill the space. The user may also choose to type in missing words or dictate their spelling phonetically using, for example, the military alphabet.

Indicating boundaries both in identifying misrecognitions in strings and in selecting alternatives for replacing misrecognitions increases the operations that can be performed on the presented alternative word sequence list. The recognizer is able to derive an extensive list of sequences of words which are (successively poorer) matches to the acoustic input. Only a portion of them can be displayed without overburdening the user. Any of the sequences may be partially correct, at their beginning, but incorrect at their ending. The user is given precisely the same option in the displayed alternative text as is provided in the regular displayed test. The user may select a portion of the alternative text, typically starting at the beginning of that text, as correct. This selected text will be accepted. The data provided by its content and boundary can be used by the recognition system to update both its internal state (probability tables) and, if necessary, the material presented as the recognized text.

Figure 7:
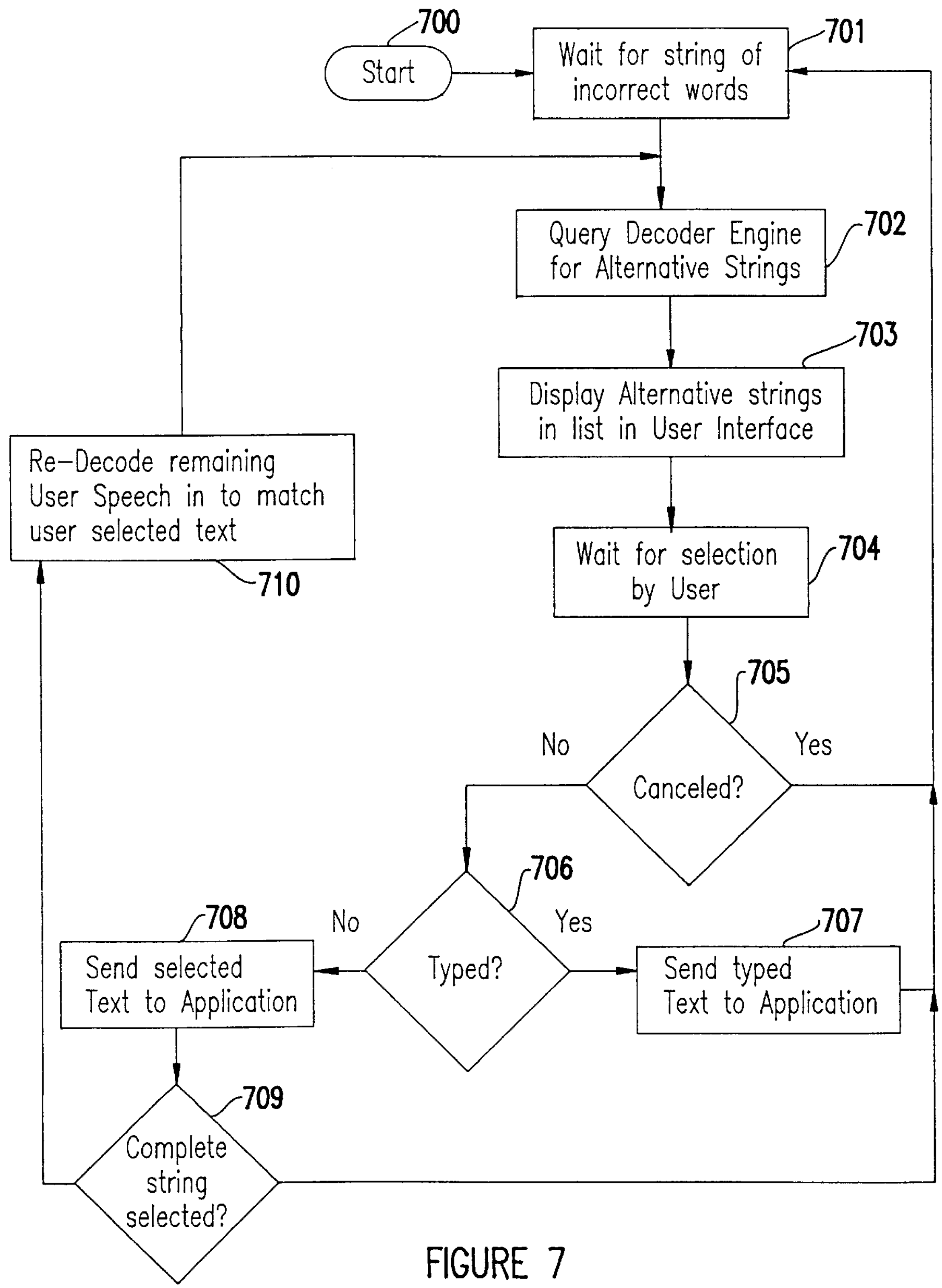
FIG. 7 is a flow chart detailing the process of the error correction system.
Figure 8:
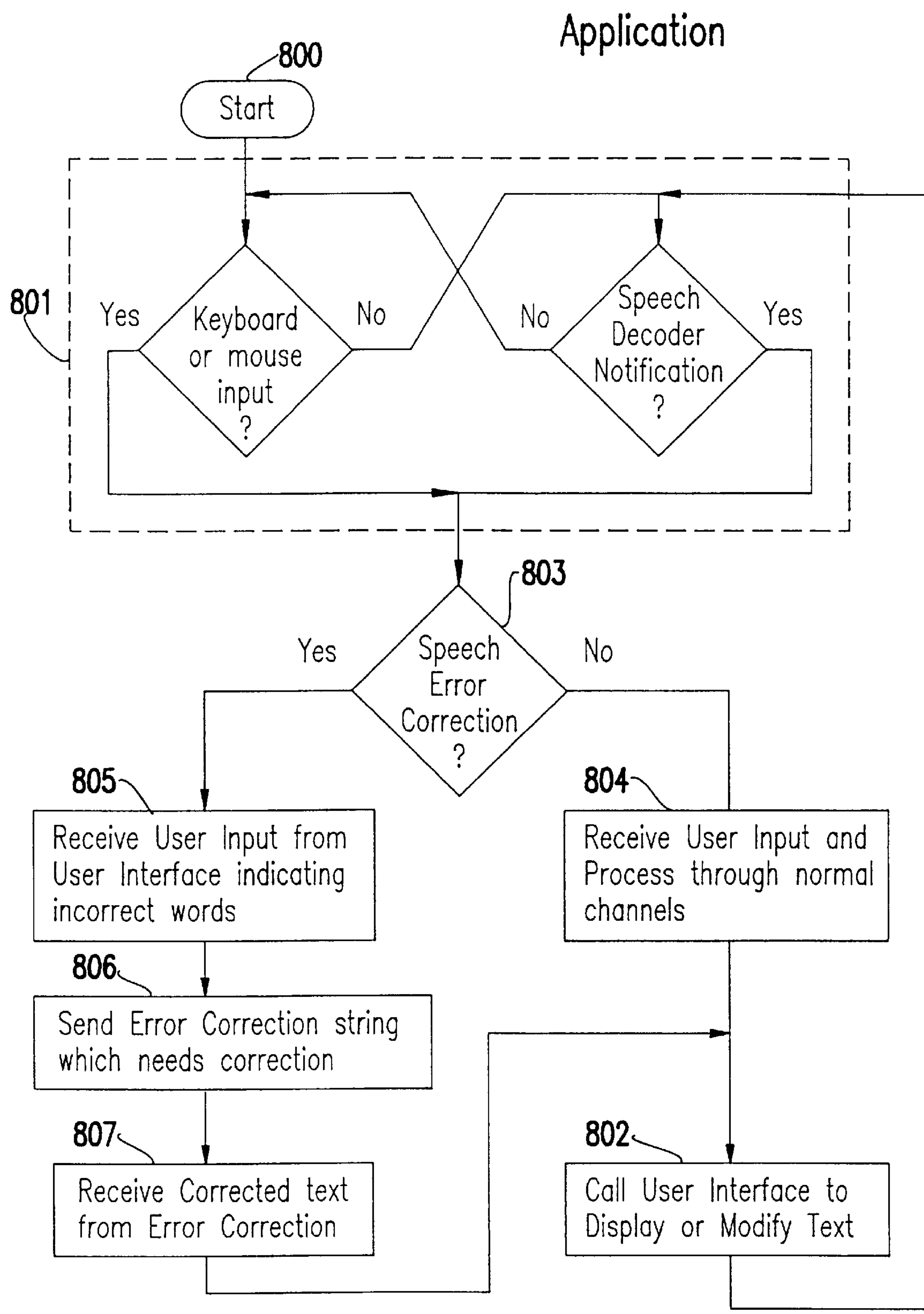
FIG. 8 is a flow chart detailing the process of an applications system.
Figure 9:
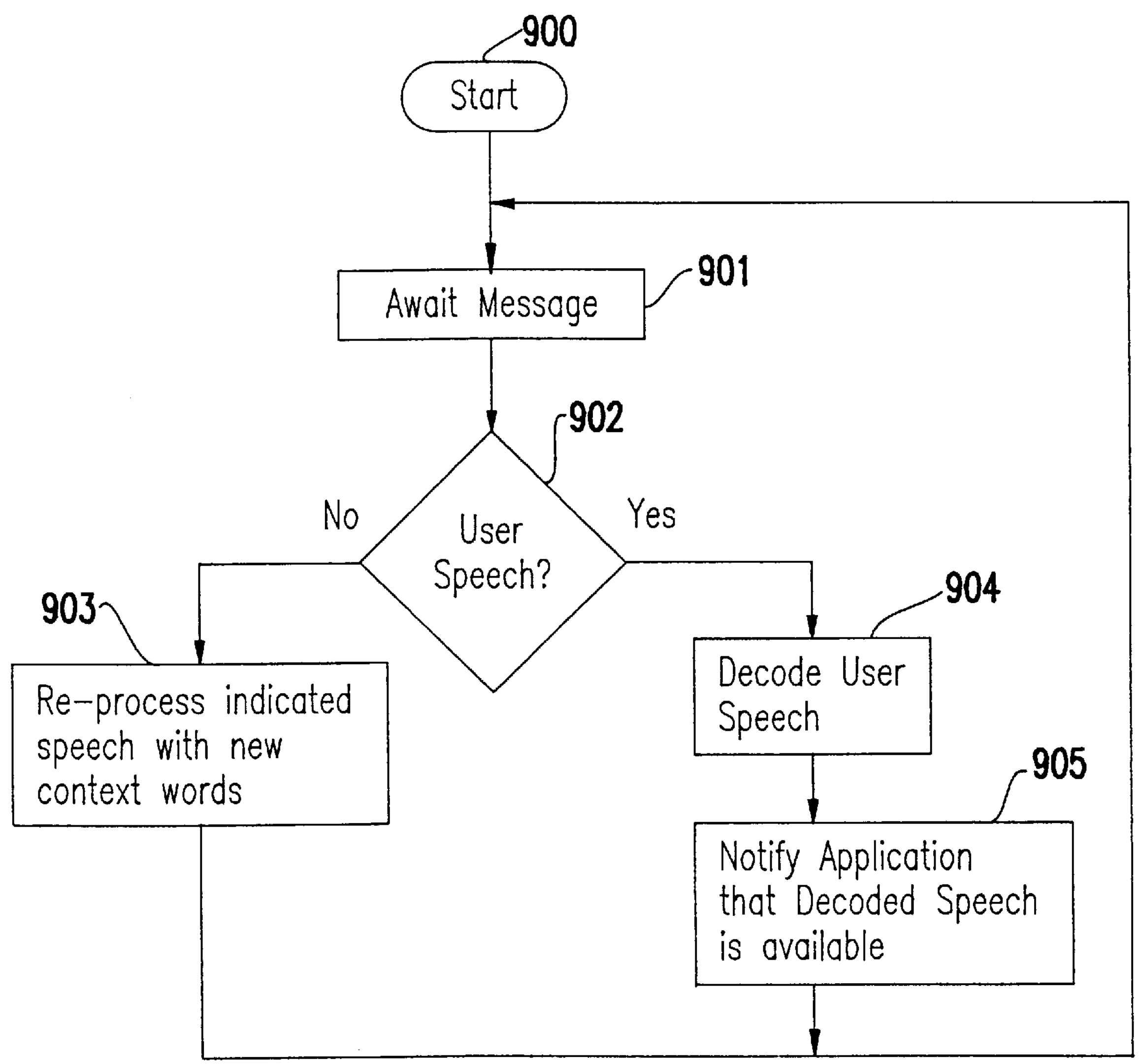
FIG. 9 is a flow chart detailing the process of the decoder engine.

The operations of the error correction system, applications, and decoder engine will be best understood with reference to FIGS. 7, 8 and 9, respectively. Typically, a speech-aware application (FIG. 8) may be started at any time. If such an application finds that there is no speech decoder (FIG. 9)operating, it can start the decoder. The error correction system (FIG. 7) may be embodied in whole or in part within the application code, within the speech decoder or as an operating system extension (OLE, DLL, etc.). The error correction system thus becomes active last. Once started, these systems operate continuously in parallel with each other; however, the operation of each system is dependent upon data in the other systems, and is affected by messages sent between the systems.

The application system, which is represented by block 207 in FIG. 2, is illustrated in the flow diagram of FIG. 8. The start in block 800 signifies that this system is activated, i.e. that the speech aware application has been started by the user. At this point, the user may dictate or operate the keyboard and mouse. The application tests 801 to see if there is input from either possible source. Once fully initialized and after the decoder has decoded some speech, the application system receives notification from either the speech decoder engine or the keyboard test in block 801. Then, as shown in block 803, the system decides whether or not error correction has been requested by the user. If not, user input is received from the user interface and processed through normal channels, as shown in block 804. The user interface is called to display or modify text in output block 802 and the system loops back to test block 801. If error correction is to occur, user input is then received from the user interface, indicating incorrect words, in function block 805. In function block 806, a string which has been indicated as incorrect by the user is sent for error correction. The string is received by the error correction system at function block 701 of FIG. 7. In function block 807, corrected text is received from the error correction system. This corrected text is received from the error correction system following the steps shown in blocks 707 and 708 of FIG. 7. Then the application system loops back to function block 802. In order to display the corrections.

The operation of the error correction system, represented by block 211 in FIG. 2, is shown in FIG. 7. The start, shown in block 700, signifies that this system is activated when the inventive error correction apparatus is turned on. The first step is shown in function block 701, where a string of consecutive incorrect words, parts of words, or a space, selected by the user is received. Then, in function block 702, the decoder engine (FIG. 9) is queried for alternative strings. Next, in output block 703, alternative strings are displayed. The output of this process to the user is shown in FIG. 4, which shows the string highlighted by the user 404 and a list of alternatives 405. The system waits for the user's selection in function block 704. Following user selection, in decision block 705, a determination is made as to whether the user has canceled the selection. If the selection is canceled, the system loops back to just before the first step and awaits to receive a string of incorrect words. If the selection is not canceled, a determination is made in decision block 706 as to whether correction text has been typed. In the inventive error correction apparatus, the user has the option to type in the desired correction. If it is typed, the typed text is sent to the application (block 807 of FIG. 8), as shown in block 707. Following sending the typed text, the error correction system loops back to waiting to receive a string of incorrect words, in function block 701. If the selection has not been typed, then the selected text is sent to the application (FIG. 8) in function block 708. Then a determination is made in decision block 709 as to whether a complete string has been selected. If a complete string has been selected, then the system loops back to waiting to receive a string of incorrect words in function block 701. If a complete string was not selected, remaining user speech is redecoded to match user selected text in function block 710. This is the process which was discussed earlier with reference to FIGS. 4 and 5. Following redecoding, the system loops to the step of querying the decoder engine in function block 702. The process continues until the whole remaining string is corrected.

The operation of the decoder engine, represented by block 203 in FIG. 2, is shown in the flow diagram of FIG. 9. The start block 900 signifies that this system is activated. This usually takes place at the initialization of a speech capable application. When the decoder engine is activated, it first awaits a message in function block 901. This message may be in the form of a request to the decoder engine as shown in function block 702 of FIG. 7 or it may be in the form of voice input as shown in block 201 of FIG. 2. When a message is received, a test is made in decision block 902 to determine if the message is user speech. If it is not user speech, the decoder engine reprocesses indicated speech interval with new context cues in function block 903. During reprocessing, the selected text is considered by the vocabulary, language, and acoustic models to develop a list of alternatives. If user speech is recognized, the decoder engine then must decode the user speech in function block 904, using the vocabulary, language, and acoustic models. Once speech is decoded, then the application (FIG. 8) is notified that decoded speech is available in function block 905. This is performed by sending data to function block 801 of FIG. 8. The decoder engine operates continuously, looping back to await receipt of additional messages in function block 900.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of correcting incorrectly decoded speech in a continuous speech recognition system comprising the steps of:

affording a user a means to select a portion of text representation of the speech as being misrecognized;

displaying a list of a multiplicity of likely alternative sequences of words to the user, wherein the list of alternative sequences is generated by including at least a word preceding said selected portion of text and/or at least a word following said selected portion of text and by decoding an interval of user speech under a constraint that a decoding of either and/or both a preceding or a following word remains unchanged;

affording the user a means to select an alternative sequence;

replacing the selected portion of text representation with a selected alternative sequence.

2. A method a correcting incorrectly decoded speech as in claim 1 wherein the method of affording the user a means to select a portion of text representation of speech includes a step of prompting the user.

3. A method of correcting incorrectly decoded speech as in claim 1 wherein the method of affording the user a means to select an alternative sequence includes a step of prompting the user.

4. A method of correcting correctly decoded speech as in claim 1 wherein said selected portion of misrecognized text representation of speech is a space.

5. A method of correcting incorrectly decoded speech as in claim 1 wherein the list of alternate words is generated including at least a word preceding said selected portion of text as the selected misrecognized portion of text representation of the speech, but displaying only alternative sequences that begin with said words preceding said selected portion.

6. A method of correcting incorrectly decoded speech as in claim 1 wherein the list of alternate words is generated including at least a word following said selected portion of text as the selected misrecognized portion of text representation of the speech, but displaying only alternative sequences that end with said words following said selected portion.

7. A method of correcting incorrectly decoded speech as in claim 1 wherein the list of alternate words is generated including at least a word preceding said selected portion of text and at least a word following said selected portion of text as the selected misrecognized portion of text representation of the speech, but displaying only alternative sequences that begin with said words preceding said selected portion and end with said words following said selected portion.

8. A method of correcting incorrectly decoded speech as in claim 1 further comprising providing a playback of speech corresponding to a portion of the text representation of the speech as being corrected.

9. A method of correcting incorrectly decoded speech as in claim 8 wherein said playback of speech includes at least a word preceding said portion of text representation.

10. A method of correcting incorrectly decoded speech as in claim 8 wherein said playback of speech includes at least a word following said portion of text representation.

11. A method of correcting incorrectly decoded speech as in claim 8 wherein said playback of speech includes at least a word preceding said portion of text representation and at least a word following said portion of text representation.

12. A method of correcting misrecognized speech continuous speech recognition system comprising the steps of:

a) affording a user a means to select a portion of a text representation of speech as being misrecognized;

b) displaying a list of a multiplicity of likely alternative sequences of words to the user, wherein the list of alternative sequences is generated by including as least a word preceding said selected portion of text and/or at least a word following said selected portion of text and by decoding an interval of user speech under a constraint that a decoding of either and/or both a preceding or a following word remains uncharged;

c) affording the user a means to select a portion of an alternative sequence;

d) using a starting and a ending boundary of a selected portion of an alternative sequence to identify a portion of a selected portion of a text representation to be replaced;

e) replacing said portion of the selected portion of a representation with a selected portion of an alternative sequence;

f) identifying any remaining misrecognized speech;

g) displaying a new list of alternative sequences for identified remaining misrecognized speech;

h) affording the user a means to select an alternative sequence from said new list; and i) replacing said remaining misrecognized with a selected alternative sequence from the new list.

13. A method of correcting misrecognized speech as in claim 12 further comprising steps of repeating said steps of f) to i) until said text representation of misrecognized speech is completely replaced.

14. A method of correcting misrecognized speech in a continuous speech recognition system as in claim 12 in which a partial word may be selected.

15. A method of correcting misrecognized speech in a continuous speech recognition system as in claim 12 wherein said partially selected alternative sequence has an ending time which falls within a word in said user selected text and further comprising the step of decoding for acoustic data representing a remainder of said word is displayed to the user with at least one place holder symbol, following replacing said portion of the selected portion of a text representation.

16. A method of correcting misrecognized speech in a continuous speech recognition system as in claim 15 wherein said place holder symbol is selected from the group consisting of graphical symbols and alphanumeric characters.

17. A method of correcting misrecognized speech in a continuous speech recognition system as in claim 12 wherein said step of affording a user means to select a portion of a text representation of speech includes at least a step of prompting the user.

18. A method of correcting misrecognized speech in a continuous speech recognition system as in claim 12 wherein said step of affording a user means to select a portion of an alternative sequence includes at least a step of prompting the user.

19. A method of correcting misrecognized speech in a continuous speech recognition system as in claim 12 wherein said step of affording a user means to select an alternative sequence from said new list includes at least a step of prompting the user.

20. A method of correcting misrecognized speech in a continuous speech recognition system as in claim 12, wherein said step of identifying any remaining misrecognized speech comprises the steps of:

determining a beginning time and an ending time of a portion of an alternative sequence;

determining a beginning time and an ending time of a user selected portion of text;

replacing a portion of said user selected text with said user selected portion of an alternative sequence; and changing from said beginning and ending times of said user selected portion of text, to reflect removing said alternative sequence replacing a portion of said user selection.

21. The method of correcting misrecognized speech in continuous speech recognition system as in claim 12, wherein said list of a multiplicity of likely alternative sequences of words is ordered by a method comprising the steps of:

matching a beginning time of each alternative sequence of words with a beginning time of said selected portion of text;

matching an ending time of each alternative sequence of words with an ending time of said selected portion of text; and ranking said alternative sequences of words according to how closely the beginning and ending times of the alternative sequences of words match the beginning and ending times of said selected portion of text.

22. The method of correcting misrecognized speech in continuous speech recognition system as in claim 12, wherein said list of a multiplicity of likely alternative sequences of words is ordered by a method comprising the steps of:

determining acoustic data for said selected portion of text;

determining acoustic data for said alternative sequence of words;

matching each alternative sequence of words by acoustic data to said selected portion of text; and ranking said alternative sequences of words according to how closely acoustic data of each alternative sequence matches acoustic data of said selected portion of text.

23. The method of correcting misrecognized speech in continuous speech recognition system as in claim 12, wherein said list of a multiplicity of likely alternative sequences of words is ordered by a method comprising the steps of:

determining language and acoustic data for said selected portion of text;

determining language and acoustic data for said alternative sequence of words;

matching each alternative sequence of words by language acoustic data to said selected portion of text; and ranking said alternative sequences of words according to how closely language acoustic data of each alternative sequence matches language and acoustic data of said selected portion of text.

24. A method as in claim 12 wherein said list of a multiplicity of alternative word sequences is reduced comprising the steps of:

grouping each of said alternative word sequences which have the same decoded words for any given portion of the sequence; and displaying at least the most likely alternatives which have different decoded word patterns.

* * * * *